April 25, 1967   H. W. BUDENBENDER   3,315,305
CORE SHEATHING APPARATUS WITH ADJUSTABLE CORE SUPPORTS
Filed May 26, 1965   2 Sheets-Sheet 1

INVENTOR
H. W. BUDENBENDER
BY
ATTORNEY

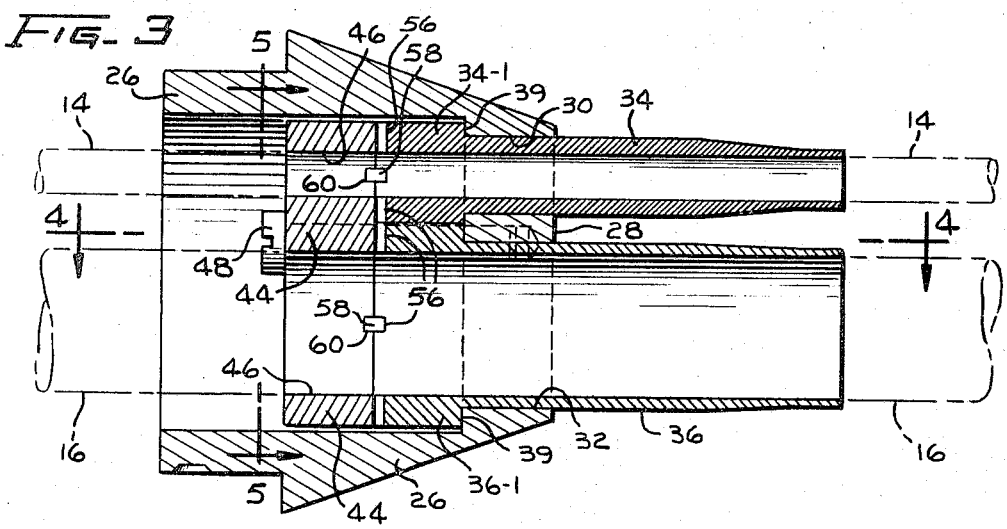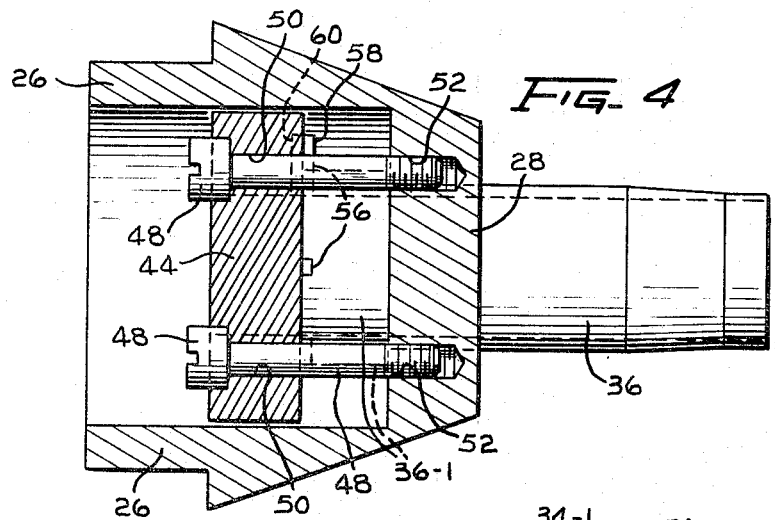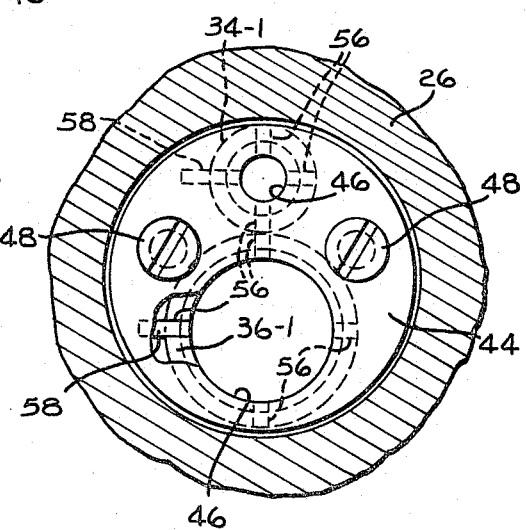

United States Patent Office 3,315,305
Patented Apr. 25, 1967

3,315,305
CORE SHEATHING APPARATUS WITH ADJUSTABLE CORE SUPPORTS
Henry W. Budenbender, Cicero, Ill., assignor to Western Electric Company, Incorporated, New York, N.Y., a corporation of New York
Filed May 26, 1965, Ser. No. 458,854
5 Claims. (Cl. 18—13)

This invention relates to core sheathing apparatus and, more particularly, to such apparatus having core supporting tubes rotatably adjustable about their axes to compensate for wear of the tubes by the cores.

In extrusion apparatus constructed to extrude a plastic sheath about a continuously moving cable, difficulty has been encountered heretofore in maintaining the cable core concentric relative to the sheath forming die orifice. Eccentricity is caused primarily by the weight of the cable subjecting the lower inner arcuate surface area of the core support tube to a greater degree of wear than the remaining inner surface area thereof. If not compensated for in some way, such eccentricities result in non-uniform thickness of the sheath extruded on the cores.

Accordingly, it is an object of this invention to provide mechanism in a core sheathing apparatus for mounting a core supporting tube for angular adjustment about its axis so as to compensate for wear thereof by the core, and to form an effective seal between the tube and the support therefor.

Another object of the invention is to provide core sheathing apparatus having a plurality of core supporting members and mechanism for mounting such core supporting members for rotative adjustment to compensate for wear thereof by the cores.

Mechanism illustrating certain aspects of the invention, as applied to core sheathing apparatus, may include a hollow support mounted in the extrusion chamber of the apparatus for movement of the cores therethrough into the chamber. In one particular application for sheathing self-supporting aerial cable, the hollow support has an end wall in which a pair of cylindrical apertures are formed. Mounted in the apertures are cylindrical tubes for supporting a stranded wire core and a cable core in predetermined spaced and parallel relation to each other while passing through the extrusion chamber and an extrusion orifice of the apparatus during the extrusion of a plastic sheath about the cores.

The core supporting tubes have flanges at one end thereof that engage the end wall of the hollow support and are held tightly thereagainst by a clamping plate. The clamping plate has clearance apertures for the cores and is removably secured to the end wall by a pair of screws. The flanged end of each core supporting tube is provided with four angularly spaced keyways which cooperate with a key on the clamping plate to hold the tube against rotation. After a substantial amount of wear occurs in the tubes, the clamping plate is loosened and separated from the ends of the core supporting tubes. The tubes are then rotated, such as 90°, to provide unworn supporting surfaces for the cores and to align the succeeding keyways with the keys, after which the clamping plate is again drawn up tightly to clamp the tubes in adjusted position.

Other objects, advantages and novel aspects of the invention will become apparent upon consideration of the following detailed description, in conjunction with the accompanying drawings, in which:

FIG. 3 is a fragmentary, vertical sectional view showing the core supporting tubes and the mounting and clamping mechanism therefor;

FIG. 4 is a horizontal sectional view of the structure shown in FIG. 3 taken along the line 4—4 of FIG. 3;

FIG. 5 is a fragmentary, vertical cross-sectional view of the structure taken on the line 5—5 of FIG. 3.

Figure 1:
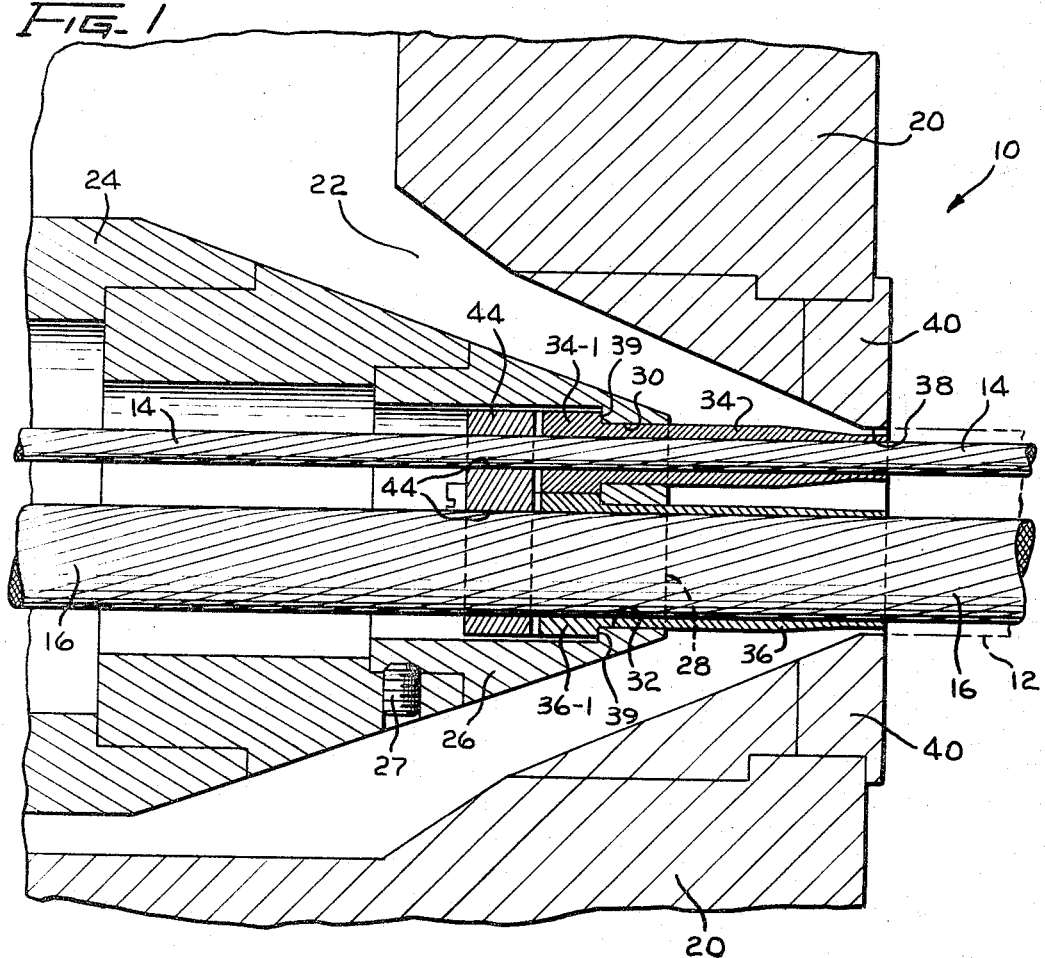
FIG. 1 is a fragmentary, vertical sectional view of an apparatus for extruding a plastic sheath around a pair of cores embodying principles of the present invention.

Referring now in greater detail to the drawings, the sheathing apparatus 10 (FIG. 1) extrudes a plastic sheath 12 (FIG. 2) about a stranded wire core 14 and a cable core 16 to form a self-supporting aerial cable 18. In cross section, the sheath 12 has wall portions of uniform thickness encircling the cores 14 and 16 and an intermediate portion or web interconnecting the core encircling portions.

Figure 2:
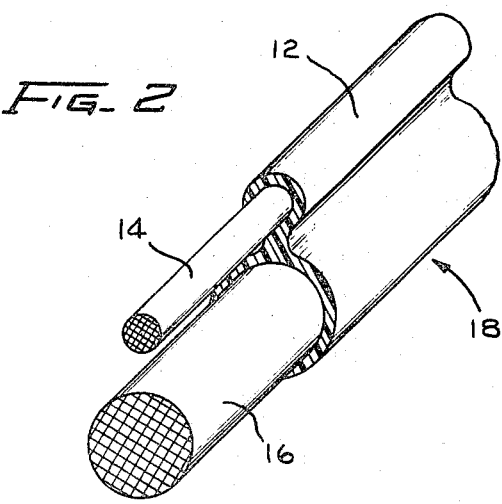
FIG. 2 is a fragmentary view in perspective of a self-supporting aerial cable of the type which is sheathed in accordance with the present apparatus.

The apparatus includes a housing 20 having an extrusion chamber 22 in which is mounted a tubular support 24 through which the cores pass in entering the extrusion chamber. The tubular support 24 has a removable section 26 secured thereto at one end by a set screw 27. The removable section 26 has an end wall 28 (FIG. 4) in which a pair of cylindrical apertures 30 and 32 are formed (FIGS. 1 and 3). A pair of cylindrical tubes 34 and 36 are respectively mounted in the apertures 30 and 32 for supporting the cores 14 and 16, respectively. Tubes 34 and 36 insure that the associated cores will be maintained in predetermined spaced and parallel relationship in passing longitudinally through the extrusion chamber and an orifice 38 of an extrusion die 40 of the apparatus.

The extrusion orifice 38 is shaped like a figure 8 to provide the desired contour of the sheath 12, and includes two circular openings to form the portions of the sheath around the cores and an intermediate opening of reduced width interconnecting the circular openings to form an interconnecting web portion of the sheath.

In their unclamped condition, the core supporting tubes 34 and 36 are freely rotatable in the apertures 30 and 32. At one end thereof, the tubes are provided with flanges 34–1 and 36–1, respectively, each flange (FIG. 3) having a surface 39 which seats against the inner surface of the end wall 28 of the supporting member 26 to form a seal therebetween. The flange 39 of tubes 34 and 36 are clamped against the end wall 28 by a circular clamping plate 44 which has a pair of apertures 46 therein to accommodate the cores 14 and 16. The clamping plate is secured to the end wall 28 of the supporting member 26 by a pair of clamping screws 48. The threaded shanks of the clamping screws 48 pass through apertures 50 in the clamping plate and engage threaded recesses 52 in the supporting member end wall 28 (FIG. 4).

Figure 6:
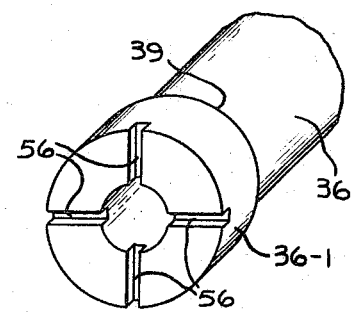
FIG. 6 is a fragmentary perspective view of one of the core supporting tubes.

The outer face of the flanged end of each of the supporting tubes 34 and 36 is slotted to provide four keyways 56 (FIG. 6) disposed in 90° angular relationship to one another. One of the keyways of each of the core supporting tubes is engaged by a key 58 (FIGS. 3 and 5) projecting from the face of the clamping plate 44 to hold the associated tube against rotation after adjustment. The keys 58, individual to the tubes 34 and 36, are seated in keyways 60 formed in the clamping plate 44.

As the cores 14 and 16 move through the tubes 34 and 36 during the sheathing operation, they rest on the lower portion of the inner surfaces of the tubes and wear grooves therein. As the depth of the grooves increase, the position of the cores 14 and 16 relative to the circular portions of the sheath-forming die orifice 38 changes from concentric to eccentric relation, resulting in corresponding changes in the thickness of different portions of the sheath on the cores.

On completion of the sheathing operation, the tubular support 24 is withdrawn from the apparatus, and the removable section 26 is separated therefrom. The clamping screws 48 are then loosened to permit the clamping plate 44 to be separated from the flanged ends of the core supporting tubes 34 and 36, and the keys 58 to be disengaged from the keyways 56 in the tubes. The core supporting tubes are then rotated 90°, for example, to place unworn portions of the tubes in position for supporting the cores 14 and 16, and to align the succeeding keyway 56 of each tube with the associated key 58 on the clamping plate 44.

Thereafter, the clamping plate 44 is moved against the flanged ends 34-1 and 36-1 of the tubes to seat the keys 60 in the keyways 56, after which the clamping screws 48 are drawn up tightly to effect the clamping of the flanged ends of the core supporting tubes to the inner face of the end wall 28 in their adjusted positions. The removable section 26 is then replaced on the tubular support 24 and secured thereto in properly aligned relation by the set screw 27. The tubular support 24 is then replaced in its predetermined position in the extrusion chamber 22 preparatory to the next core sheathing operation.

It is to be understood that the above-described arrangement is simply illustrative of the application of the principles of this invention. Numerous other arrangements may be readily devised by those skilled in the art which will embody the principles of the invention and fall within the spirit and scope thereof.

What is claimed is:

1. In an extrusion apparatus having an extrusion chamber and an extrusion orifice, the combination therewith of:
   support means mounted within said extrusion chamber and forming a passageway for movement of an elongated core through the chamber, said support means having an end wall provided with at least one cylindrical aperture therethrough;
   a cylindrical tubular member adjustably mounted rotatably in said aperture of said end wall and extending therefrom for supporting a core for longitudinal movement through both the extrusion chamber and the extrusion orifice, said tubular member being provided with an annular flange having a surface engaging said wall to form a seal therebetween;
   a movable member for engaging said flange;
   cooperative means on said cylindrical tubular member and said movable member for locking said cylindrical tubular member against rotation relative to said movable member when said members are in engagement with each other; and
   adjustable means mounted on said end wall for urging said movable member axially toward said end wall to effect the clamping without rotation of said flange to said end wall.

2. In an extrusion apparatus having an extrusion chamber and an extrusion orifice, the combination therewith of:
   support means mounted within said extrusion chamber and forming a passageway for movement of an elongated core through the chamber, said means having an end wall provided with at least one cylindrical aperture;
   a cylindrical tubular member adjustably mounted rotatably in said aperture of said end wall and extending therefrom for supporting a core for longitudinal movement through both the extrusion chamber and the extrusion orifice, said tubular member being provided with an annular flange having a surface engaging said wall to form a seal therebetween;
   a movable member for engaging said flange;
   adjustable means mounted on said end wall for urging said movable member axially toward said end wall to effect the clamping without rotation of said flange to said end wall;
   one of said cylindrical and clamping members being provided with a plurality of aligning recesses in angularly spaced relation to one another about the axis of said cylindrical aperture; and
   the other of said members being provided with a projecting portion which is selectively and respectively receivable in said recesses to lock said tubular member in an adjusted position.

3. In an extrusion apparatus having an extrusion chamber and an extrusion orifice, the combination therewith of:
   support means mounted within said extrusion chamber and forming a passageway for movement of an elongated core through the chamber, said means having an end wall provided with at least one cylindrical aperture;
   a cylindrical tubular member adjustably mounted rotatably in said aperture of said end wall and extending therefrom for supporting the core for longitudinal movement through both the extrusion chamber and the extrusion orifice, said tubular member at one end thereof being provided with an enlarged annular portion having a surface engaging said wall to form a seal therebetween;
   a clamping member for engaging said enlarged annular portion of said tubular member;
   cooperative interlocking means on said cylindrical tubular member and said clamping member for preventing rotation of said cylindrical tubular member when engaged by said clamping member; and
   a plurality of threaded elements adjustably mounted on said end wall for urging said clamping member axially toward said wall to effect the clamping of said enlarged annular portion of said tubular member to said wall.

4. In an extrusion apparatus having an extrusion chamber and an extrusion orifice, the combination therewith of:
   support means mounted within said extrusion chamber and forming a passageway for movement of an elongated core through the chamber, said support means having an end wall provided with a cylindrical aperture;
   a cylindrical tubular member adjustably mounted rotatably in said aperture of said end wall and extending therefrom for supporting a core for longitudinal movement through both the extrusion chamber and the extrusion orifice, said tubular member at one end thereof being provided with an enlarged annular portion having a surface engaging said wall to form a seal therebetween, and further having a plurality of keyways in angularly spaced relation to one another about the axis of said member;
   a clamping member for engaging said enlarged end portion of said tubular member and having a key affixed to one face thereof, said key being receivable in said keyways individually for locking said tubular member against rotation; and
   a pair of elements adjustably mounted on said end wall for urging said clamping member axially toward said wall to effect the clamping of said enlarged end portion to said end wall.

5. In an extrusion apparatus having an extrusion chamber and an extrusion orifice, the combination therewith of:
   support means mounted within said extrusion chamber and forming a passageway for movement of elongated cores into the chamber, said support means having an end wall provided with a pair of cylindrical apertures;
   a different cylindrical tubular member adjustably mounted rotatably in each of said apertures of said wall for supporting an associated elongated core for longitudinal movement through both the extrusion chamber and the extrusion orifice, each of said tubular members being provided at one end thereof with an annular flange having a surface engaging said wall to form a seal therebetween;

a clamping member for engaging the flanged ends of said tubular members;

a pair of threaded elements adjustably mounted on said wall for urging said clamping member axially toward said wall to effect the clamping of said flanged ends of said tubular members against said wall;

said flanged end of each of said tubular members having a plurality of aligning recesses in angularly spaced relation to one another about the axis of said tubular member; and said clamping member having two elements thereon, one for each of said tubular members, each of said elements being receivable in different recesses individually of said associated tubular member for holding said tubular members against rotation.

References Cited by the Examiner

UNITED STATES PATENTS

| 1,726,359 | 9/1929 | Martell et al. | 18—13 |
| 2,185,701 | 1/1940 | Boyle | 18—13 |

WILLIAM J. STEPHENSON, *Primary Examiner.*